United States Patent
Otsubo

(10) Patent No.: US 7,930,086 B2
(45) Date of Patent: Apr. 19, 2011

(54) SHIFTING APPARATUS AND SHIFTING CONTROL METHOD THEREOF

(75) Inventor: Masaaki Otsubo, Nishikamo-gun (JP)

(73) Assignee: Toyota Jidosha Kabushiki Kaisha, Toyota-shi (JP)

(\*) Notice: Subject to any disclaimer, the term of this patent is extended or adjusted under 35 U.S.C. 154(b) by 704 days.

(21) Appl. No.: 10/570,604

(22) PCT Filed: Jan. 27, 2005

(86) PCT No.: PCT/IB2005/000196
§ 371 (c)(1),
(2), (4) Date: Mar. 3, 2006

(87) PCT Pub. No.: WO2005/080831
PCT Pub. Date: Sep. 1, 2005

(65) Prior Publication Data
US 2008/0248923 A1 Oct. 9, 2008

(30) Foreign Application Priority Data
Jan. 30, 2004 (JP) ................................. 2004-024082

(51) Int. Cl.
*B60W 10/02* (2006.01)
*B60K 17/02* (2006.01)
(52) U.S. Cl. .......................................... 701/66; 477/79
(58) Field of Classification Search .................. 701/51, 701/54–59, 64, 66–68; 477/77–80, 83–86, 477/90–93, 124
See application file for complete search history.

(56) References Cited

U.S. PATENT DOCUMENTS

| 4,683,996 | A | | 8/1987 | Hattori et al. | |
|---|---|---|---|---|---|
| 4,785,917 | A | * | 11/1988 | Tateno et al. | 477/78 |
| 4,849,888 | A | * | 7/1989 | Seto | 701/51 |
| 5,152,192 | A | | 10/1992 | Koenig et al. | |
| 5,634,867 | A | | 6/1997 | Mack | |
| 6,394,929 | B1 | * | 5/2002 | Miyazaki | 477/77 |
| 6,935,204 | B2 | * | 8/2005 | Walker et al. | 74/335 |
| 2002/0033059 | A1 | * | 3/2002 | Pels et al. | 74/329 |
| 2002/0108830 | A1 | * | 8/2002 | Ochi et al. | 192/3.63 |
| 2004/0112171 | A1 | * | 6/2004 | Kuhstrebe et al. | 74/730.1 |
| 2005/0267665 | A1 | * | 12/2005 | Iwatsuki et al. | 701/70 |

FOREIGN PATENT DOCUMENTS

DE 199 56 527 5/2000
(Continued)

*Primary Examiner* — Mark Hellner
*Assistant Examiner* — Ari M Diacou
(74) *Attorney, Agent, or Firm* — Oblon, Spivak, McClelland, Maier & Neustadt, L.L.P.

(57) ABSTRACT

An ECU executes a program including a step of detecting a running speed of a vehicle and a current gear stage of the vehicle, a step of determining whether or not shifting is required, a step of calculating a required period T(D) for performing double clutch control if shifting is required, a step of calculating a required period T(S) for synchro-rotational synchronization, a step of determining whether or not the required period T(D) for double clutch control is equal to or shorter than the required period T(S) for synchro-rotational synchronization, and a step of carrying out shifting by performing double clutch control if the required period T(D) for double clutch control is equal to or shorter than the required period T(S) for synchro-rotational synchronization. A sense of incongruity felt by a driver during shifting is thereby suppressed.

17 Claims, 10 Drawing Sheets

FOREIGN PATENT DOCUMENTS

| | | |
|---|---|---|
| DE | 102 12 320 | 9/2002 |
| EP | 1 055 546 | 11/2000 |
| JP | 61-28933 | 2/1986 |
| JP | 63-155735 | 10/1988 |
| JP | 3-79855 | 4/1991 |
| JP | 5-203039 | 8/1993 |
| JP | 8-200399 | 8/1996 |
| JP | 8-312686 | 11/1996 |
| JP | 9-28673 | 2/1997 |
| JP | 10-9006 | 1/1998 |
| JP | 2001-280472 | 10/2001 |
| JP | 2002-39360 | 2/2002 |
| JP | 2002-122230 | 4/2002 |
| JP | 2002-362196 | 12/2002 |
| JP | 2002-364742 | 12/2002 |
| JP | 2003-335152 | 11/2003 |
| WO | 03/074905 | 9/2003 |

\* cited by examiner

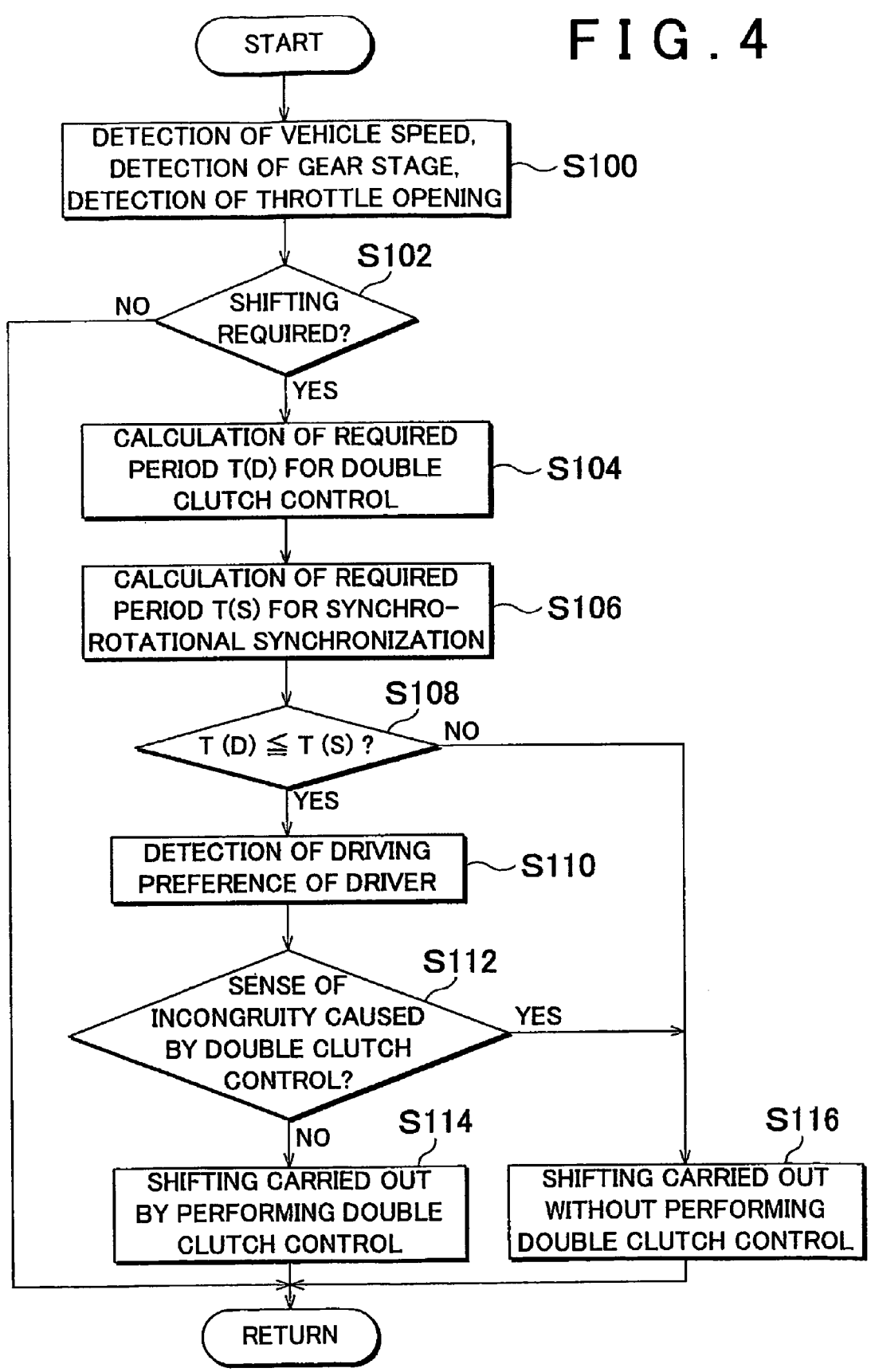

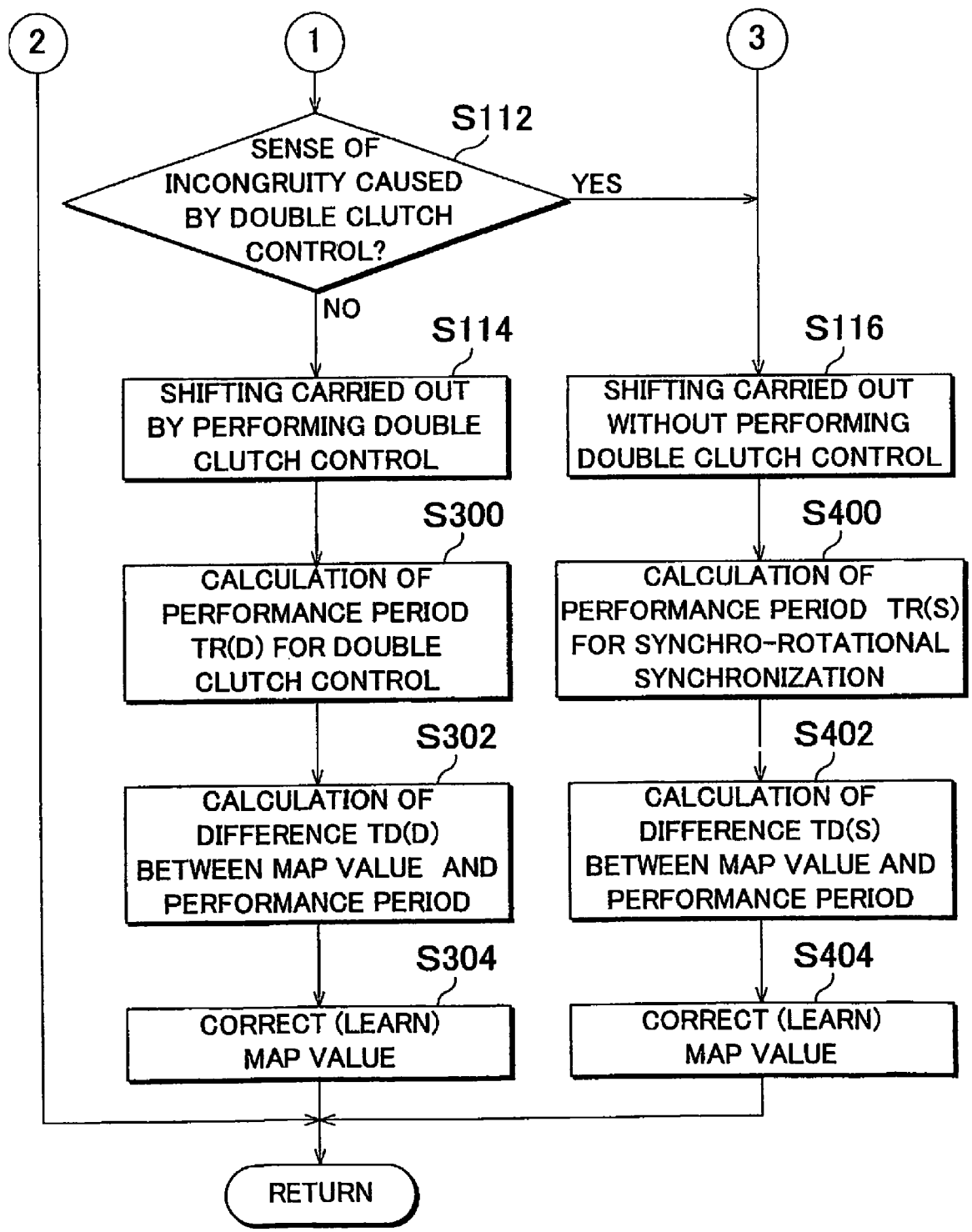

SHIFTING APPARATUS AND SHIFTING CONTROL METHOD THEREOF

BACKGROUND OF THE INVENTION

1. Field of the Invention

The invention relates to a shifting apparatus and a shifting control method thereof. In particular, the invention relates to a normally meshed gear transmission and a shifting control method thereof.

2. Description of the Related Art

There has been known a related art wherein an actuator is used to engage or release a clutch and select a gear stage in a shifting apparatus having a normally meshed gear transmission. In some of shifting apparatuses thus constructed, so-called double clutch control is performed. That is, in switching from one gear stage to another (e.g., in performing downshift), a clutch is temporarily engaged in a neutral state to cause a rise in engine speed, so that input and output shafts of a normally meshed gear transmission will synchronize with each other.

Japanese Patent Application Laid-Open No. 2001-280472 discloses a rotational synchronization device for a transmission which suitably utilizes electronic control to achieve further facilitation. The rotational synchronization device for the transmission disclosed in Japanese Patent Application Laid-Open No. 2001-280472 has a dog gear and a sleeve, and carries out rotational synchronization of a transmission that is electronically synchronically controlled. The dog rear is rotatable with respect to a main shaft and rotates together with a main gear that is driven by an engine via a clutch. The rotational synchronization device of this transmission includes a double clutch control portion that performs double clutch control for raising a rotational speed of the dog gear by temporarily connecting the clutch and controlling rotation of the engine if a rotational speed of the dog gear (a rotational speed of the main gear) in a shifting target gear stage is lower than a rotational speed of the sleeve (a rotational speed of the main shaft) in switching from one gear stage to another, and that prohibits double clutch control if a vehicle runs at a low speed and decelerates.

According to the invention disclosed in this publication, rotational synchronization can be realized by raising the rotational speed of the dog gear to match the rotational speed of the sleeve through double clutch control. For instance, in making a downshift while traveling uphill, if the vehicle is almost on the verge of stopping while running at a low speed that is substantially decreasing, double clutch control is prohibited. If double clutch control is prohibited, rotational synchronization is rapidly carried out with the aid of a decrease in the rotational speed of the sleeve. Hence, the operation of switching from one gear stage to another is rapidly completed, and a feeling of smooth and comfortable shifting can be obtained.

In the rotational synchronization device for the transmission disclosed in the aforementioned publication, if the rotational speed of the dog gear in the shifting target gear stage is lower than the rotational speed of the sleeve during a switch in gear stage when the vehicle is neither running at a low speed nor decelerating, double clutch control is performed. In double clutch control, however, after the clutch has been disconnected, the gear is neutralized to temporarily connect the clutch and raise the engine speed, so that the rotational speeds of the input and output shafts of the normally meshed gear transmission are synchronized with each other. After the completion of synchronization, the clutch is disconnected again to switch from one gear stage to another. Then the clutch is connected again. Namely, the operation of disconnecting the clutch needs to be performed twice. The shifting period in double clutch control is not always shorter than the shifting period in synchro control. Hence, the shifting period is prolonged, and a sense of incongruity resulting from undesired performance of shifting may be conveyed to the driver of the vehicle.

SUMMARY OF THE INVENTION

The invention, which has been made as a solution to the above-mentioned problem, provides a shifting apparatus and a shifting control method thereof which can suppress a sense of incongruity conveyed to a driver.

Thus, as an exemplary embodiment of the invention, there is provided a shifting apparatus including a normally meshed gear transmission and a clutch that couples/decouples the normally meshed gear transmission to/from a power unit. The normally meshed gear transmission includes an input shaft, an output shaft, and a synchronization mechanism that mechanically synchronizes a rotational speed of the input shaft with a rotational speed of the output shaft during shifting. The shifting apparatus includes synchronization means for rendering the normally meshed gear transmission in a neutral state where the input shaft is mechanically decoupled from the output shaft, connecting the clutch, controlling an output rotational speed of the power unit, and synchronizing the rotational speed of the input shaft with the rotational speed of the output shaft. The shifting apparatus further comprises first calculation means, second calculation means, comparison means, and shifting control means. The first calculation means calculates a first synchronization period required for synchronization by the synchronization mechanism. The second calculation means calculates a second synchronization period required for synchronization by the synchronization means. The comparison means compares the first synchronization period calculated by the first calculation means with the second synchronization period calculated by the second calculation means. The shifting control means shifts the normally meshed gear transmission by synchronizing the rotational speed of the input shaft with the rotational speed of the output shaft by means of the synchronization mechanism if the first synchronization period is shorter than the second synchronization period, and shifts the normally meshed gear transmission by synchronizing the rotational speed of the input shaft with the rotational speed of the output shaft by means of the synchronization means if the second synchronization period is equal to or shorter than the first synchronization period.

In another aspect of the invention, there is provided a shifting control method for a shifting apparatus including a normally meshed gear transmission and a clutch that couples/decouples the normally meshed gear transmission to/from a power unit. The normally meshed gear transmission includes an input shaft, an output shaft, and a synchronization mechanism that mechanically synchronizes a rotational speed of the input shaft with a rotational speed of the output shaft during shifting. The shifting apparatus includes synchronization means for rendering the normally meshed gear transmission in a neutral state where the input shaft is mechanically decoupled from the output shaft, connecting the clutch, controlling an output rotational speed of the power unit, and synchronizing the rotational speed of the input shaft with the rotational speed of the output shaft. The shifting control method further comprises the steps of calculating a first synchronization period required for synchronization by the synchronization mechanism, calculating a second synchronization period required for synchronization by the synchronization means, comparing the first synchronization period with the second synchronization period, shifting the normally meshed gear transmission by synchronizing the rotational speed of the input shaft with the rotational speed of the output shaft by means of the synchronization mechanism if the first synchronization period is shorter than the second synchronization period, and shifting the normally meshed gear transmission by synchronizing the rotational speed of the input shaft with the rotational speed of the output shaft by means of the synchronization means if the second synchronization period is equal to or shorter than the first synchronization period.

According to the shifting apparatus and shifting control method thereof as described above, the synchronization means renders the normally meshed gear transmission in the neutral state where the input shaft is mechanically decoupled from the output shaft, connects the clutch, controls the output rotational speed of the power unit, and synchronizes the rotational speed of the input shaft with the rotational speed of the output shaft. First of all, the first synchronization period required for synchronization by the synchronization mechanism, and the second synchronization period required for synchronization by the synchronization means are calculated. The first and second synchronization periods thus calculated are compared with each other. If the first synchronization period is shorter than the second synchronization period, the normally meshed gear transmission is shifted by synchronizing the rotational speed of the input shaft with the rotational speed of the output shaft by means of the synchronization mechanism. If the second synchronization period is shorter than the first synchronization period, the normally meshed gear transmission is shifted by synchronizing the rotational speed of the input shaft with the rotational speed of the output shaft by means of the synchronization means. Thus, shifting is carried out by synchronizing the input shaft with the output shaft by means of that one of the synchronization mechanism and the synchronization means which requires a shorter required period for synchronization. Therefore, an actual shifting period can be restrained from becoming longer than a shifting period expected by the driver. As a result, it is possible to provide a shifting apparatus and a shifting control method thereof which can suppress a sense of incongruity that is conveyed to the driver owing to a difference between the expected shifting period and the actual shifting period.

Further, the shifting apparatus in which the first calculation means calculates the first synchronization period on the basis of a map stored in advance is also preferable, and the shifting control method in which the first synchronization period is calculated on the basis of a map stored in advance is also preferred.

According to the shifting apparatus and shifting control method thereof as described above, the first synchronization period required for synchronization by the synchronization mechanism is calculated on the basis of the map stored in advance. Thus, the period required for synchronization by the synchronization mechanism can be calculated swiftly.

Further, the shifting apparatus in which the first calculation means updates the first synchronization period by storing into the map a value that has been corrected and learned on the basis of a difference between a calculated period and an actual performance period is also preferable, and the shifting control method in which the first synchronization period is updated by storing into the map a value that has been corrected and learned on the basis of a difference between a calculated period and an actual performance period is also preferable.

According to the shifting apparatus and shifting control method thereof as described above, the first synchronization period stored in the map is corrected and learned on the basis of the difference between the calculated period and the actual performance period. Therefore, the first synchronization period is improved in precision.

Further, the shifting apparatus in which the second calculation means calculates the second synchronization period on the basis of a map stored in advance is also preferable, and the shifting control method in which the second synchronization period is calculated on the basis of a map stored in advance is also preferable.

According to the shifting apparatus and shifting control method thereof as described above, the second synchronization period is calculated on the basis of the map stored in advance. Thus, the second synchronization period can be calculated swiftly.

Further, the shifting apparatus in which the second calculation means updates the second synchronization period by storing into the map a value that has been corrected and learned on the basis of a difference between a calculated period and an actual performance period is also preferable, and the shifting control method in which the second synchronization period is updated by storing into the map a value that has been corrected and learned on the basis of a difference between a calculated period and an actual performance period is also preferable.

According to the shifting apparatus and shifting control method thereof as described above, the second synchronization period stored in the map is corrected and learned on the basis of the difference between the calculated period and the actual performance period. Therefore, the second synchronization period is improved in precision.

Further, the shifting apparatus is mounted in a vehicle and further comprises a first detection means and decision means. The first detection means detects a driving preference of a driver of the vehicle. The decision means decides whether to permit or prohibit synchronization by the synchronization means on the basis of the detected driving preference. The shifting apparatus is also characterized in that the shifting control means shifts the normally meshed gear transmission by synchronizing a rotational speed of the input shaft with a rotational speed of the output shaft by means of the synchronization mechanism if synchronization by the synchronization means is prohibited.

Further, the shifting control method further comprises the steps of detecting a driving preference of a driver of a vehicle, deciding whether to permit or prohibit synchronization by the synchronization means on the basis of the detected driving preference, and shifting the normally meshed gear transmission by synchronizing a rotational speed of the input shaft with a rotational speed of the output shaft by means of the synchronization mechanism if synchronization by the synchronization means is prohibited.

According to the shifting apparatus and shifting control method thereof as described above, the driving preference of the driver of the vehicle is detected, and it is decided whether to permit or prohibit synchronization by the synchronization means on the basis of the driving preference detected. Thus, it is detected whether or not the driver is inclined toward accelerating performance as in the case where a manual shift mode allowing the driver to select a gear stage through a switching operation or a sport mode in which shifting is carried out at an engine speed higher than usual or the like has been selected or in the case where an accelerator pedal has been depressed. If the driver is inclined toward accelerating performance to the extent of anticipating the performance of synchronization by the synchronization means and not feeling engine noise (e.g., blowup noise) during synchronization by the synchronization means as a sense of incongruity, synchronization by the synchronization means can be carried out. If not, synchronization by the synchronization means can be prohibited. If synchronization by the synchronization means is prohibited, the normally meshed gear transmission is shifted by synchronizing the rotational speed of the input shaft with the rotational speed of the output shaft by means of the synchronization mechanism. Thus, in the case where the driver is not inclined toward accelerating performance and does not anticipate the performance of synchronization by the synchronization means, blowup noise or the like of the engine can be suppressed. As a result, a sense of incongruity that is conveyed to the driver owing to a difference between operation of the vehicle expected by the driver and actual operation of the vehicle can be suppressed.

Further, it is also preferable that the shifting apparatus further comprise determination means that determines, on the basis of the detected driving preference, whether or not synchronization by the synchronization means conveys a sense of incongruity to the driver, and that the decision means decide to prohibit synchronization by the synchronization means if it is determined that synchronization by the synchronization means conveys a sense of incongruity to the driver. Furthermore, it is also preferable that the shifting control method further comprise the steps of determining, on the basis of the detected driving preference, whether or not synchronization by the synchronization means conveys a sense of incongruity to the driver, and deciding to prohibit synchronization by the synchronization means if it is determined that synchronization by the synchronization means conveys a sense of incongruity to the driver.

According to the shifting apparatus and shifting control method thereof as described above, it is determined, on the basis of the driving preference detected, whether or not synchronization by the synchronization means conveys a sense of incongruity to the driver. If it is determined that synchronization by the synchronization means conveys a sense of incongruity to the driver, prohibition of synchronization by the synchronization means is decided. Thus, based on whether or not the driver is inclined toward accelerating performance, for example, as in the case where the manual shift mode allowing the driver to select a gear stage through a switching operation or the sport mode in which shifting is carried out at an engine speed higher than usual or the like has been selected or in the case where the accelerator pedal has been depressed, the driver can anticipate the performance of synchronization by the synchronization means. Also, it is possible to determine whether or not the driver feels engine noise (e.g., blowup noise) during synchronization by the synchronization means as a sense of incongruity. If it is determined that the engine noise during synchronization by the synchronization means conveys a sense of incongruity to the driver, synchronization by the synchronization means is prohibited. Thus, in the case where the driver is not inclined toward accelerating performance and does not anticipate the performance of synchronization by the synchronization means, blowup noise of the engine or the like can be suppressed, and a sense of incongruity that is conveyed to the driver owing to the difference between operation of the vehicle expected by the driver and actual operation of the driver can be suppressed.

Further, it is also preferable that the shifting apparatus further comprise a second detection means that detects a remaining amount of energy supplied to the power unit, and that the shifting control means prohibit synchronization by the synchronization means and carry out synchronization by the synchronization mechanism if the detected remaining amount of energy is smaller than a predetermined remaining amount. Further, it is also preferable that the shifting control method further comprise the steps of detecting a remaining amount of energy supplied to the power unit and prohibiting synchronization by the synchronization means and carrying out synchronization by the synchronization mechanism if the detected remaining amount of energy is smaller than a predetermined remaining amount.

According to the shifting apparatus and shifting control method thereof as described above, the remaining amount of energy supplied to the power unit is detected, and synchronization by the synchronization means is prohibited and synchronization by the synchronization mechanism is carried out if the remaining amount of energy thus detected is smaller than a predetermined remaining amount. Thus, when the remaining amount of energy is smaller than the predetermined remaining amount, consumption of a larger amount of energy can be prohibited from being caused by, for example, a rise in the output rotational speed of the power unit resulting from synchronization by the synchronization means. As a result, a deterioration in fuel consumption can be suppressed, and a sense of incongruity resulting from an unsuppressed amount of consumption can be suppressed, for example, in the case where the driver desires to suppress the consumption of energy.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which:

FIG. 4 is a flowchart of a control structure of a program that is executed by an ECU in the vehicle mounted with the shifting apparatus according to the first embodiment of the invention;

FIGS. 8A and 8B are flowcharts of a control structure of a program that is executed by the ECU in a vehicle mounted with a shifting apparatus according to a third embodiment of the invention.

DETAILED DESCRIPTION OF PREFERRED EMBODIMENTS

In the following description and the accompanying drawings, the invention will be described in more detail in terms of exemplary embodiments. In the following description, like components are denoted by like reference symbols. Those components which are accompanied by the same reference symbol are identical in name and function and therefore will not be repeatedly described in detail.

Figure 1:
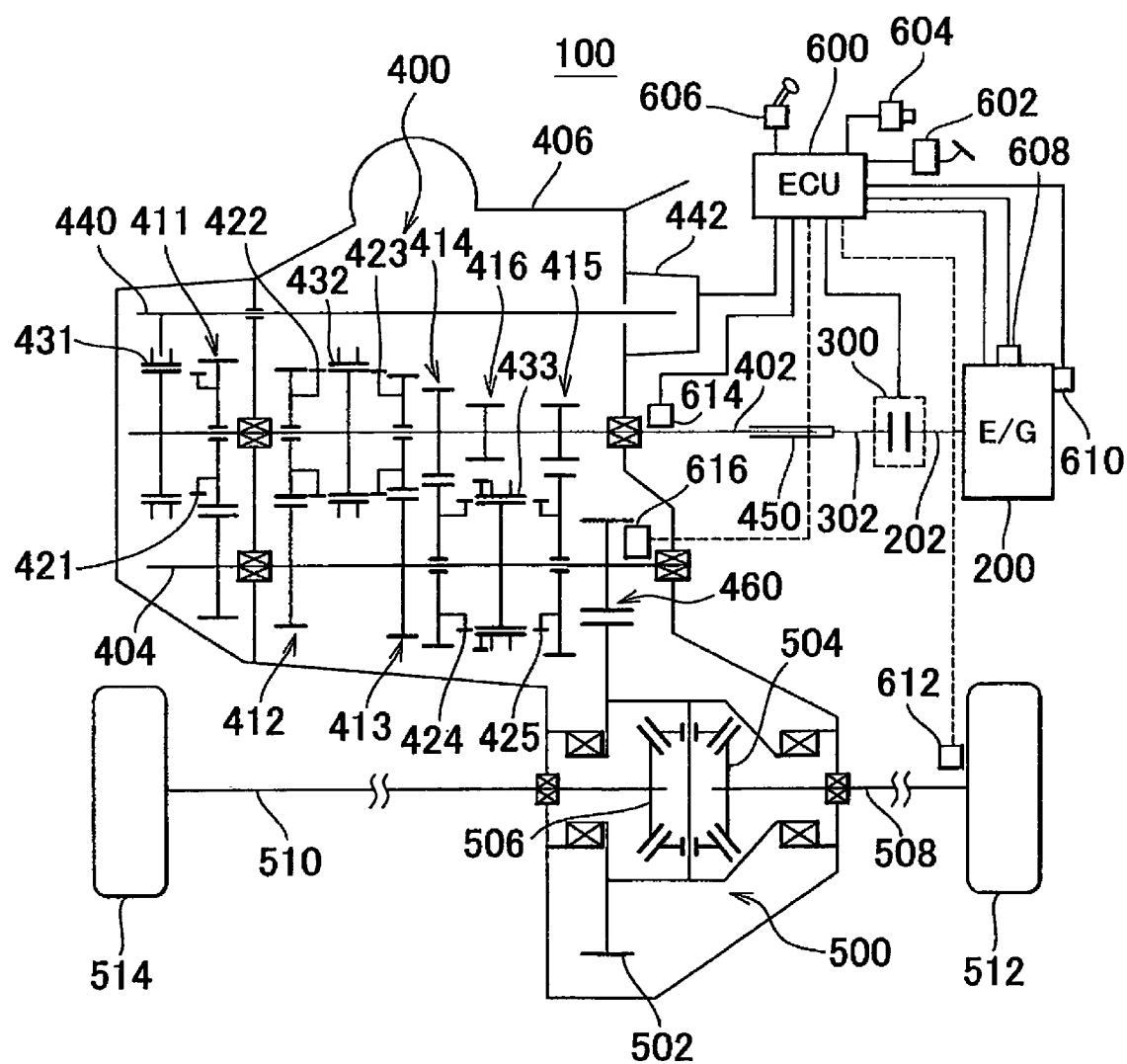
FIG. 1 is a general view of a vehicle mounted with a shifting apparatus according to a first embodiment of the invention.

Referring to FIG. 1, a vehicle mounted with a shifting apparatus according to a first embodiment of the invention will be described. A vehicle 100 is an FF (front-engine front-drive) vehicle. It is not absolutely required that the vehicle mounted with the shifting apparatus according to the invention be an FF vehicle.

The vehicle 100 is a vehicle with no clutch pedal wherein a desired gear stage is established by operating, by means of an actuator, a clutch and a normally meshed gear transmission that is identical in type with a manual transmission of the related art. In the vehicle 100, an auto shift mode or a manual shift mode can be selected. In the auto shift mode, upshift or downshift is performed on the basis of a map defined by vehicle speed and throttle opening. In the manual shift mode, a driver can select an arbitrary gear stage according to the driver's operation. In the auto shift mode, it is possible to select a sport mode in which shifting is carried out at an engine speed higher than usual.

The vehicle 100 includes an engine 200, a clutch 300, a transmission 400, a differential gear (hereinafter referred to simply as a differential) 500, and an ECU (electronic control unit) 600. The shifting apparatus according to the present embodiment is realized, for example, by a program executed by the ECU 600.

The engine 200 is an internal combustion engine in which an air-fuel mixture injected by an injector (not shown) is exploded in a cylinder to depress a piston (not shown) and rotate a crank shaft 202. The vehicle 100 is mounted with the engine 200 as a power source. The vehicle 100 runs by a driving force transmitted from the engine 200. Instead of the engine 200, other power units such as a motor may be installed in the vehicle 100.

Figure 2:
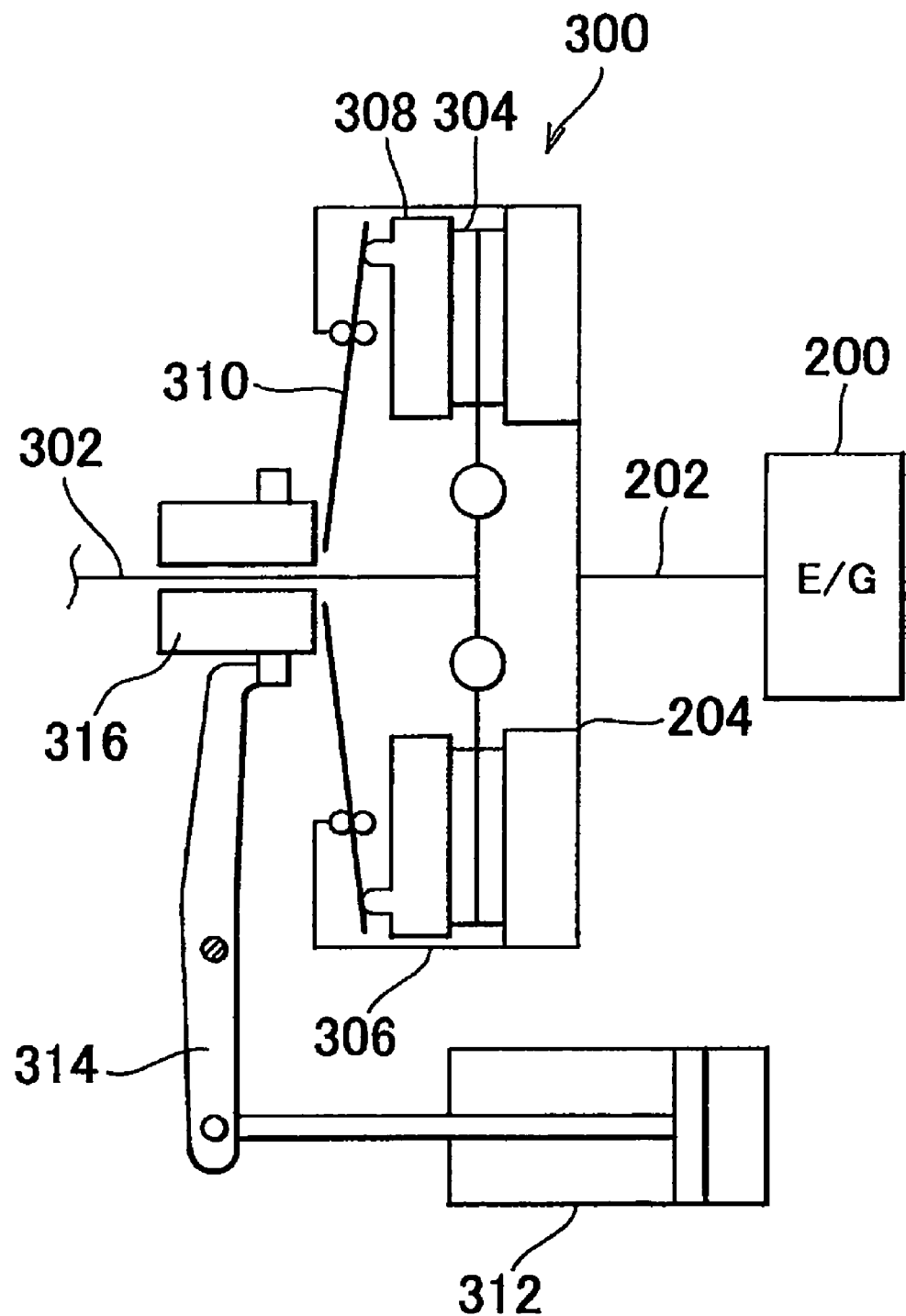
FIG. 2 is a sectional view of a clutch in the vehicle mounted with the shifting apparatus according to the first embodiment of the invention.

The clutch 300 is a dry single-plate friction clutch. As shown in FIG. 2, the clutch 300 includes a clutch output shaft 302, a clutch disk disposed on the clutch output shaft 302, a clutch housing 306, a pressure plate 308 disposed in the clutch housing 306, a diaphragm spring 310, a clutch release cylinder 312, a release fork 314, and a release sleeve 316.

The diaphragm spring 310 urges the pressure plate 308 rightwards in FIG. 2, whereby the clutch disk 304 is pressed against a flywheel 204 attached to the crank shaft 202 of the engine 200. As a result, the clutch is connected.

The clutch release cylinder 312 moves the release sleeve 316 rightwards in FIG. 2 via the release fork 314, whereby an inner end portion of the diaphragm spring 310 moves rightwards in FIG. 2. If the inner end portion of the diaphragm spring 310 moves rightwards in FIG. 2, the pressure plate 308 moves leftwards in FIG. 2. Then the clutch disk 304 moves away from the flywheel 204, and the clutch is disengaged.

The clutch release cylinder 312 operates by being supplied with a hydraulic pressure from a hydraulic circuit (not shown). The clutch release cylinder 312 is controlled by an ECU 600. The clutch 300 may adopt a generally known art and thus will not be described in any more detail. It is also appropriate that the clutch 300 be electrically engaged or released.

Referring again to FIG. 1, the transmission 400 includes an input shaft 402, an output shaft 404, and a housing 406. The transmission 400 and the differential 500 are both accommodated in the housing 406. The transmission 400 is a normally meshed gear transmission.

The input shaft 402 and the output shaft 404 are arranged in parallel. A plurality of speed change gear pairs 411 to 415 having different gear ratios and a backward gear pair 416 are disposed between the input shaft 402 and the output shaft 404.

While one of two gears constituting each of the speed change gear pairs is provided on the input shaft 402, the other is provided on the output shaft 404. Further, while one of the two gears constituting each of the speed change gear pairs can idly rotate with respect to a corresponding one of the shafts, the other rotates together with the other shaft. The two gears constituting each of the speed change gear pairs are always meshed with each other.

The speed change gear pairs 411 to 415 are provided with corresponding clutch gears 421 to 425 respectively. Provided between the shafts and the clutch gears 421 to 425 are synchromesh mechanisms 431 to 433, which couple the shafts to the clutch gears 421 to 425 with their rotational speeds being synchronized. A certain one of the clutch gears 421 to 425 is coupled to the shafts by a certain one of the synchromesh mechanisms 431 to 433, whereby a certain one of first to fifth gear stages is established. If all the clutch gears are disconnected from the shafts, the transmission 400 assumes its neutral state.

The backward gear pair 416 is meshed with a backward idle gear disposed on a countershaft (not shown). If the backward gear pair 416 is meshed with the backward idle gear, a backward gear stage is established.

The synchromesh mechanisms 431 to 433 are operated by an actuator 442 that is controlled by the ECU 600, via a fork shaft 440. The synchromesh mechanisms 431 to 433 are constructed as key-type synchromesh mechanisms. Alternatively, double cone synchromesh mechanisms or the like may be employed instead of the key-type synchromesh mechanisms.

Figure 3A:
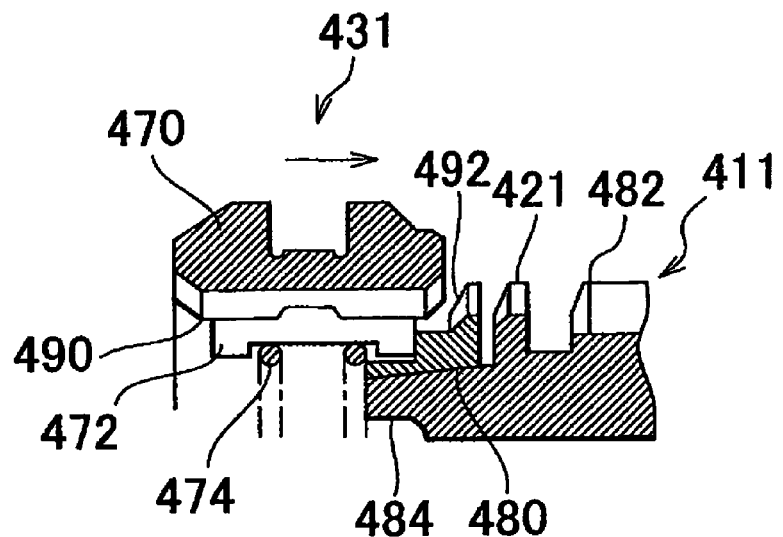
FIGS. 3A and 3B are partially sectional views of a synchromesh mechanism in the vehicle mounted with the shifting apparatus according to the first embodiment of the invention.
Figure 3B:
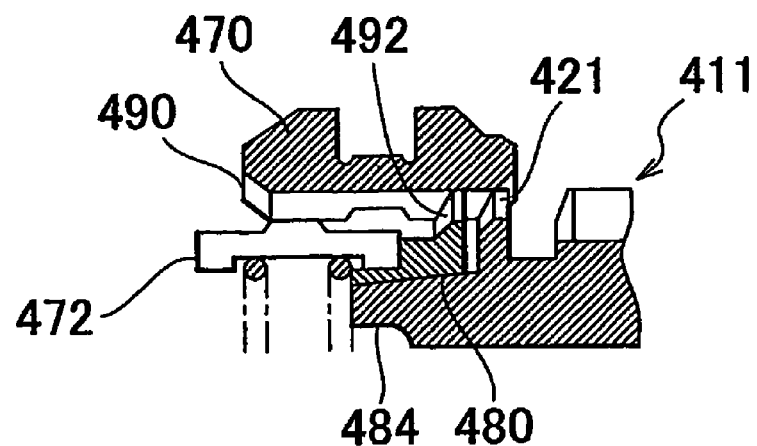

Referring to FIGS. 3A and 3B, the synchromesh mechanism 431 will be described. The synchromesh mechanisms 432 and 433 are identical with the synchromesh mechanism 431 and therefore will not be described hereinafter.

As shown in FIG. 3A, the synchromesh mechanism 431 includes a sleeve 470, a synchronizer key 474, a synchronizer ring 480, and a tapered cone portion 484. The tapered cone portion 484 is provided in an input gear 482 which is one of the gears constituting the speed change gear pair 411 and which can idly rotate with respect to the input shaft 402.

The sleeve 470 is moved toward the clutch gear 421 by the actuator 442 via the fork shaft 440. The synchronizer key 472 is engaged with the sleeve 470 by being urged thereon by a key spring 474. The sleeve 470, the synchronizer key 472, and a synchronizer hub (not shown) rotate together with the input shaft 402.

The synchronizer ring 480 is provided between the input gear 482 and the synchronizer key 472. The synchronizer key 472 is engaged in a groove formed in the synchronizer ring 480. The synchronizer ring 480 and the synchronizer key 472 rotate together.

If the sleeve 470 is moved rightwards in FIG. 3A, the synchronizer key 472 is moved together with the sleeve 470. If the synchronizer key 472 moves, the synchronizer ring 480 is pressed against the cone portion 484 and fitted thereto in a tapered manner.

If the synchronizer ring 480 and the cone portion 484 are fitted to each other in a tapered manner, power is gradually transmitted from the input shaft 402 to the input gear 482 due to friction between the synchronizer ring 480 and the cone portion 484. While the synchronizer ring 480 and the input gear 482 somewhat slip with respect to each other, the rotational speed of the input shaft 402 and the rotational speed of the input gear 482 gradually become equal to each other (synchronize with each other).

The input gear 482 is always meshed with that one of the gears constituting the speed change gear pair 411 which is integrally provided on the output shaft 404. Therefore, if the rotational speed of the input shaft 402 and the rotational speed of the input gear 482 synchronize with each other, the rotational speed of the input shaft 402 and the rotational speed of the output shaft 404 synchronize with each other.

If the sleeve 470 is moved further rightwards, a spline 490 formed in the sleeve 470 is meshed with a spline 492 formed in the synchronizer ring 480 and the clutch gear 421 provided in the input gear 482 as shown in FIG. 3B. If the spline 490 of the sleeve 470 is meshed with the clutch gear 421, the input shaft 402 and the output shaft 404 are coupled to each other. Consequently, power is transmitted from the input shaft 402 to the output shaft 404 via the speed change gear pair 411.

Referring again to FIG. 1, the input shaft 402 is coupled to the clutch output shaft 302 of the clutch 300 by a spline 450. An output gear 460 is disposed on the output shaft 404 and meshed with a ring gear 502 of the differential 500.

The differential 500 includes a pair of side gears 504 and 506. Drive shafts 508 and 510 are respectively coupled to the side gears 504 and 506, for example, by being spline-fitted thereto. Power is transmitted to front-right and front-left wheels 512 and 514 via the drive shafts 508 and 510 respectively.

An accelerator opening sensor 602, a sport mode switch 604, a shift lever 606, a rotational speed sensor 608, a temperature sensor 610, a vehicle speed sensor 612, an input rotational speed sensor 614, and an output rotational speed sensor 616 are connected to the ECU 600. The accelerator opening sensor 602 detects a depression amount of an accelerator and transmits a signal indicating a detection result to the ECU 600. The sport mode switch 604 is operated by the driver if sporty driving with enhanced accelerating performance wherein shifting is carried out at an engine speed higher than usual is preferred.

The driver operates the shift lever 606 so as to select a desired gear stage. A gear stage of the transmission 400 is automatically established according to a range (e.g., a D range) corresponding to the shift lever 606. Further, in accordance with the driver's operation, it is possible to select the manual shift mode that allows the driver to select an arbitrary gear stage.

The rotational speed sensor 608 detects a rotational speed of the engine 200 and transmits a signal indicating a detection result to the ECU 600. The temperature sensor 610 detects a temperature of oil in the engine 200 and transmits a signal indicating a detection result to the ECU 600. The vehicle speed sensor 612 detects a running speed of the vehicle 100 from a rotational speed of the drive shaft 508 and transmits a signal indicating a detection result to the ECU 600. The input rotational speed sensor 614 detects a rotational speed of the input shaft 402 and transmits a signal indicating a detection result to the ECU 600. The output rotational speed sensor 616 detects a rotational speed of the output shaft 404 and transmits a signal indicating a detection result to the ECU 600.

Based on the signals transmitted from these sensors, a throttle opening sensor (not shown) and the like and a map and a program that are stored in a ROM (read only memory), the ECU 600 controls the components such that the vehicle 100 runs in a desired manner.

Referring to FIG. 4, the control structure of a program that is executed by the ECU 600 in the vehicle mounted with the shifting apparatus according to the present embodiment will be described.

In step (hereinafter abbreviated as S) 100, the ECU 600 detects a running speed of the vehicle 100, a throttle opening, and a current gear stage. Methods of detecting a vehicle speed, a throttle opening, and a gear stage will not be described below in detail because generally known technologies may be employed.

In S102, the ECU 600 determines from the detected vehicle speed, throttle opening and current gear stage whether or not shifting is required (i.e., the current gear stage is to be changed to another gear stage). To determine whether or not shifting is required, in the case where the vehicle is driven in the auto shift mode, it is appropriate, for example, to utilize a map such as a variogram stored in the ROM. On the other hand, in the case where the vehicle is driven in the manual shift mode, the determination may be made, for example, depending on whether or not the driver has operated the shift lever 606. If it is determined that shifting is required (YES in S102), a transition to S104 is made. If not (NO in S102), the present routine is terminated.

In S104, the ECU 600 calculates a required period T(D) for performing control operations of disconnecting the clutch 300, neutralizing the transmission 400, then temporarily connecting the clutch 300 and controlling the engine speed to synchronize the rotational speed of the input shaft 402 with the post-shifting rotational speed of the output shaft 404 (these control operations will be hereinafter referred to as double clutch control). To calculate the required period T(D) for performing the double clutch control, it is appropriate, for example, that a map containing parameters such as gear stage, rotational speed of the input shaft 402, rotational speed of the output shaft 404, difference between pre-shifting and post-shifting rotational speeds of the input shaft 402, engine speed, temperature of oil in the engine 200, clutch stroke and the like be stored in the ROM, and that the period T(D) be calculated from the map.

In S106, the ECU 600 calculates a required period T(S) for synchronizing the rotational speed of the input shaft 402 with the post-shifting rotational speed of the output shaft 404 only by means of the synchromesh mechanisms 431 to 433 without performing the double clutch control (this operation will be hereinafter referred to as synchro-rotational synchronization). To calculate the required period T(S) for performing the synchro-rotational synchronization, it is appropriate, for example, that a map containing parameters such as gear stage, rotational speed of the input shaft 402, rotational speed of the output shaft 404, difference between pre-shifting and post-shifting rotational speeds of the input shaft 402, engine speed, temperature of oil in the engine 200, load applied to the synchronizer ring 480 and the like be stored in the ROM, and that the period T(S) be calculated from the map.

In S108, the ECU 600 determines whether or not the required period T(D) for performing the double clutch control is shorter than the required period T(S) for performing the synchro-rotational synchronization. If the required period T(D) for performing the double clutch control is shorter than the required period T(S) for performing the synchro-rotational synchronization (YES in S108), a transition to S110 is made. If not (NO in S108), a transition to S116 is made.

In S110, the ECU 600 detects a driving preference of the driver. For instance, the driving preference means preference for accelerating performance. It is to be noted, however, that the driving preference is not limited thereto. To detect a driving preference, for example, a desired gear stage is detected depending on whether or not the manual shift mode to be selected by the driver through a switching operation, the sport mode in which the engine speed for carrying out shifting is set higher than usual, or the like has been selected, depending on whether or not the accelerator pedal has been depressed, or the like. The method of detecting a driving preference is not limited to those mentioned above.

In S112, the ECU 600 determines whether or not the double clutch control conveys a sense of incongruity to the driver. The sense of incongruity conveyed to the driver means, for example, blowup noise of the engine 200 which is generated in performing the double clutch control. It is to be noted, however, that the sense of incongruity is not limited thereto. In the case where the manual shift mode or the sport mode is selected or where the accelerator pedal has been depressed, the driver is inclined toward accelerating performance and thus anticipates the performance of the double clutch control. Therefore, it is determined that blowup noise of the engine 200 or the like does not convey a sense of incongruity to the driver even if the double clutch control is performed (NO in S112), and a transition to S114 is made. If the driver is not inclined toward accelerating performance, the driver does not anticipate the performance of the double clutch control. Therefore, it is determined that a sense of incongruity is conveyed to the driver if the double clutch control is performed (YES in S112), and a transition to S116 is made.

In S114, the ECU 600 carries out shifting by performing the double clutch control. In S116, the ECU 600 carries out shifting without performing the double clutch control.

In the vehicle mounted with the shifting apparatus according to the present embodiment which is based on the aforementioned construction and flowchart, the operation of the ECU 600 will be described. In the present embodiment, the description will be made as to an exemplary case where the driver has depressed a brake pedal to decelerate the vehicle.

If the driver depresses the brake pedal to decelerate the vehicle, a running speed of the vehicle 100 and a current gear stage of the vehicle 100 are detected (S100), and it is determined whether or not shifting is required (S102). It is assumed herein that since the vehicle 100 now runs at a third-speed gear stage with the vehicle speed having decreased, the third-speed gear stage is to be changed to a second-speed gear stage (YES in S102).

Since shifting is required (YES in S102), the required period T(D) for performing the double clutch control is calculated (S104), and the required period T(S) for the synchro-rotational synchronization is calculated (S106). If the respective periods are calculated (S104, S106), it is determined whether or not the required period T(D) for the double clutch control is equal to or shorter than the required period T(S) for the synchro-rotational synchronization (S108). If the required period T(D) for the double clutch control is equal to or shorter than the required period T(S) for the synchro-rotational synchronization (YES in S108), a driving preference of the driver is detected (S110).

If the driver is inclined toward accelerating performance, for example, if the manual shift mode or the sport mode has been selected or if the accelerator pedal has been depressed, the driver anticipates the performance of the double clutch control. Therefore, it is determined that blowup noise of the engine 200 or the like does not convey a sense of incongruity to the driver even if the double clutch control is performed (NO in S112). Thus, shifting is carried out by performing the double clutch control (S114).

Figure 5A:
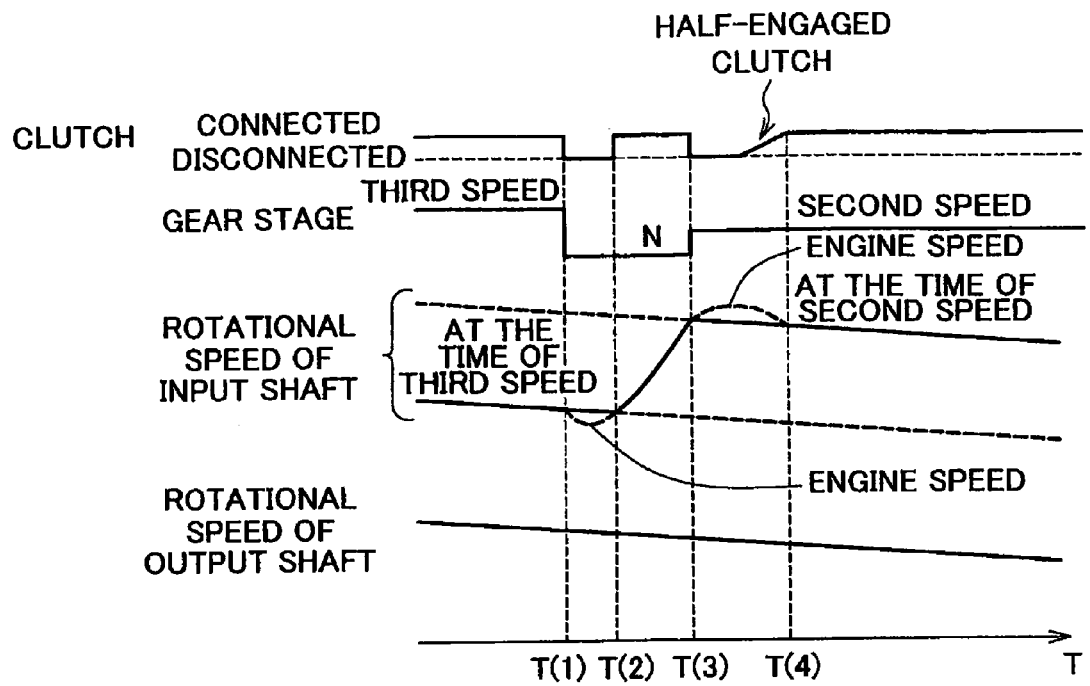
FIG. 5A is a timing chart in the case where double clutch control is performed and FIG. 5B is a timing chart in the case where double clutch control is not performed.

In this case, as shown in FIG. 5A, the clutch 300 is shut off at a timing T(1), and the transmission 400 is shifted from the third-speed gear stage to the neutral state. Because the output shaft 404 is always coupled to the front wheels 512 and 514, the rotational speed of the output shaft 404 gradually decreases as the vehicle speed decreases.

In performing a downshift from the third speed to the second speed, the gear ratio is increased. Therefore, the rotational speed of the input shaft 402 is higher in the case where the second-speed gear stage is to be established than in the case where the third-speed gear stage is established. Hence, it is required that the rotational speed of the input shaft 402 be raised to a value corresponding to the rotational speed of the output shaft 404 in the case where the second-speed gear stage has been established, and that the rotational speed of the input shaft 402 be synchronized with the post-shifting rotational speed of the output shaft 404.

To raise the rotational speed of the input shaft 402 to the value in the case where the second-speed gear stage is established, the clutch 300 is connected to couple the input shaft 402 to the crank shaft 202 at a timing T(2). If the input shaft 402 is coupled to the crank shaft 202, the engine speed is raised until the rotational speed of the input shaft 402 becomes equal to the value in the case where the second-speed gear stage is established.

If the rotational speed of the input shaft 402 becomes equal to the value in the case where the second-speed gear stage is established at a timing T(3), synchronization of the input shaft 402 with the output shaft 404 is completed. As a result, the clutch 300 is disconnected and the second-speed gear stage is established. The clutch 300 then goes through a half-engaged state, and is connected at a timing T(4). Shifting is thus completed.

If the required period T(S) for the synchro-rotational synchronization is shorter than the required period T(D) for the double clutch control (NO in S108) and if it is determined that the performance of the double clutch control conveys a sense of incongruity to the driver because the driver is not inclined toward accelerating performance and does not anticipate the performance of the double clutch control (YES in S112), shifting is carried out without performing the double clutch control (S116).

Figure 5B:
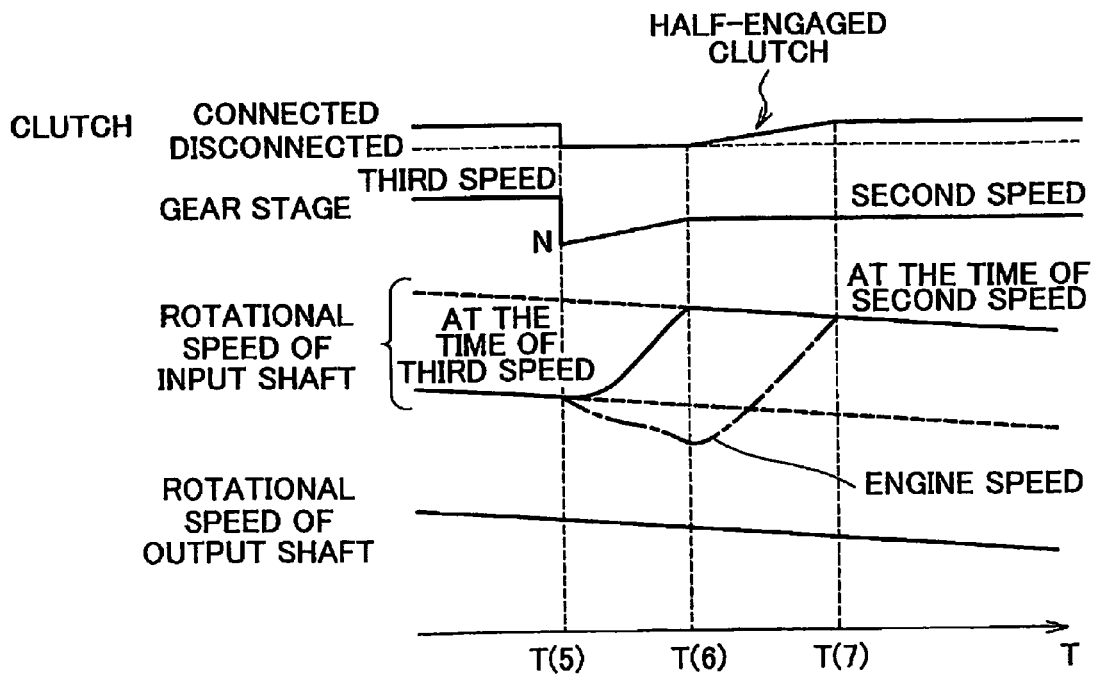

In this case, as shown in FIG. 5B, the clutch 300 is disconnected at a timing T(5), so that the sleeve 470 is moved toward the clutch gear corresponding to the speed change gear pair establishing the second-speed gear stage. As a result, the second-speed gear stage is established through the neutral state.

In this state, as the sleeve 470 is moved toward the clutch gear corresponding to the speed change gear pair establishing the second-speed gear stage, the rotational speed of the input shaft 402 increases. If the sleeve 470 engages the clutch gear corresponding to the speed change gear pair establishing the second-speed gear stage at a timing T(6) so that the rotational speed of the input shaft 402 has become equal to the value in the case where the second-speed gear stage is established, synchronization of the input shaft 402 with the output shaft 404 is completed. Upon completion of synchronization, the clutch 300 goes through a half-engaged state and then is connected at a timing T(7). Shifting is thus completed.

As described above, in the vehicle mounted with the shifting apparatus according to the present embodiment, the ECU detects a running speed of the vehicle and a current gear stage of the vehicle and determines whether or not shifting is required. If shifting is required, the ECU calculates the required period T(D) for performing the double clutch control and the required period T(S) for the synchro-rotational synchronization. If the required period T(D) for the double clutch control is shorter than the required period T(S) for the synchro-rotational synchronization, shifting is carried out by performing the double clutch control. If the required period T(S) for the synchro-rotational synchronization is shorter than the required period T(D) for the double clutch control, shifting is carried out without performing the double clutch control. Thus the extension of a shifting period resulting from prolongation of a required period for synchronization of the input shaft with the output shaft can be suppressed. As a result, shifting can be carried out at a timing expected by the driver, and a sense of incongruity conveyed to the driver owing to a difference between an expected shifting period and an actual shifting period can be suppressed.

Figure 6:
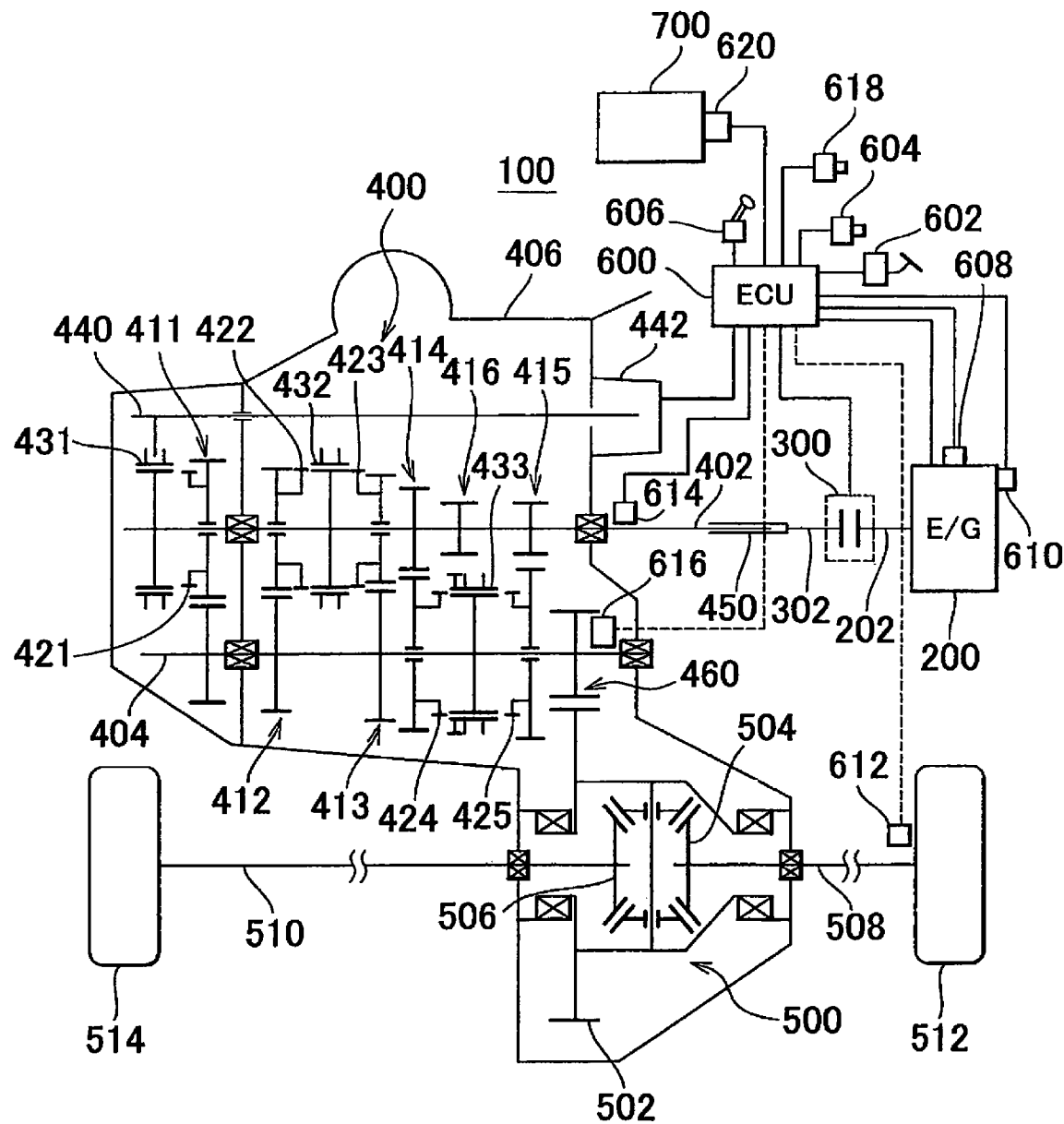
FIG. 6 is a general view of a vehicle mounted with a shifting apparatus according to a second embodiment of the invention.
Figure 7A:
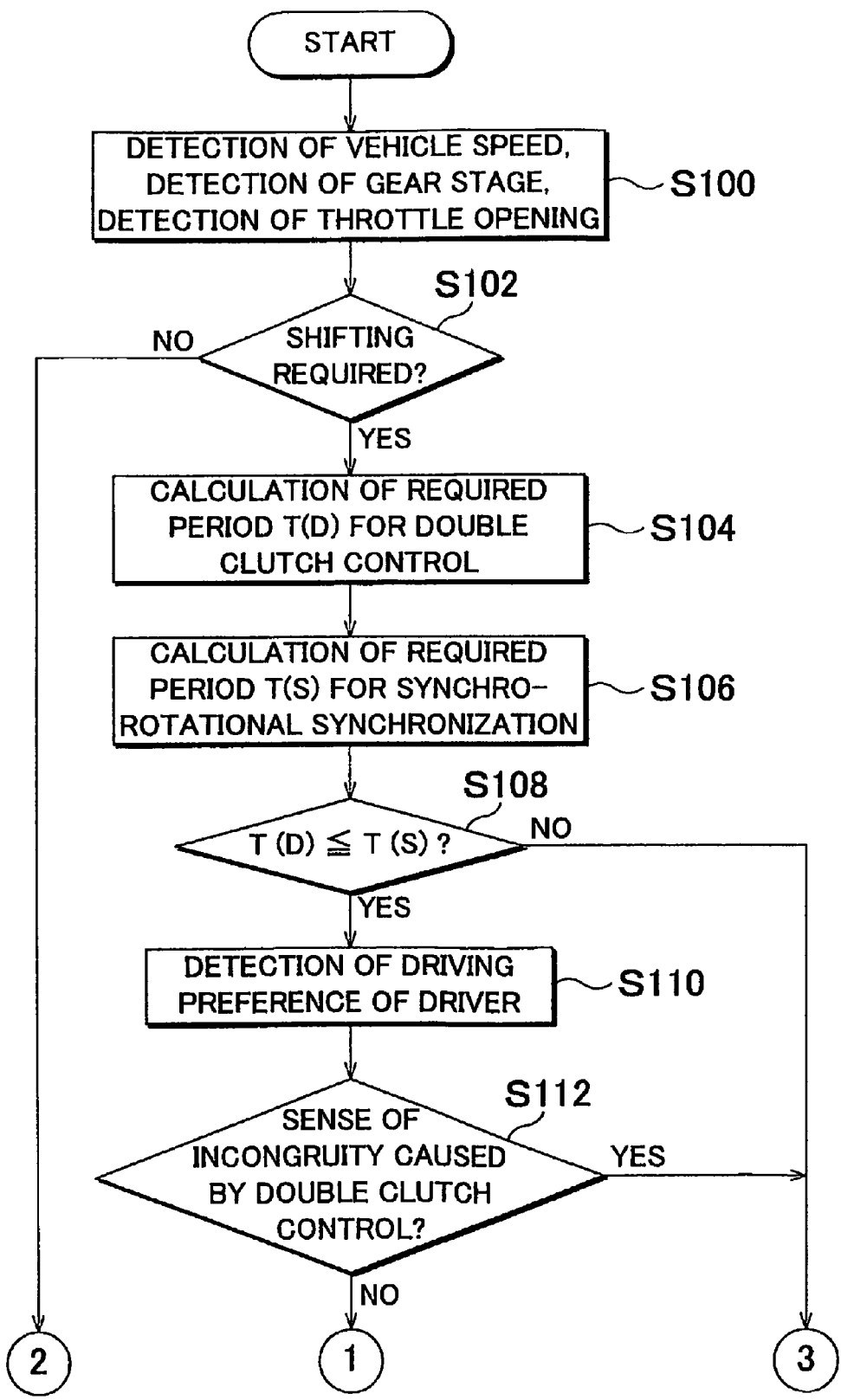
FIGS. 7A and 7B are flowcharts of a control structure of a program that is executed by the ECU in the vehicle mounted with the shifting apparatus according to the second embodiment of the invention.
Figure 7B:
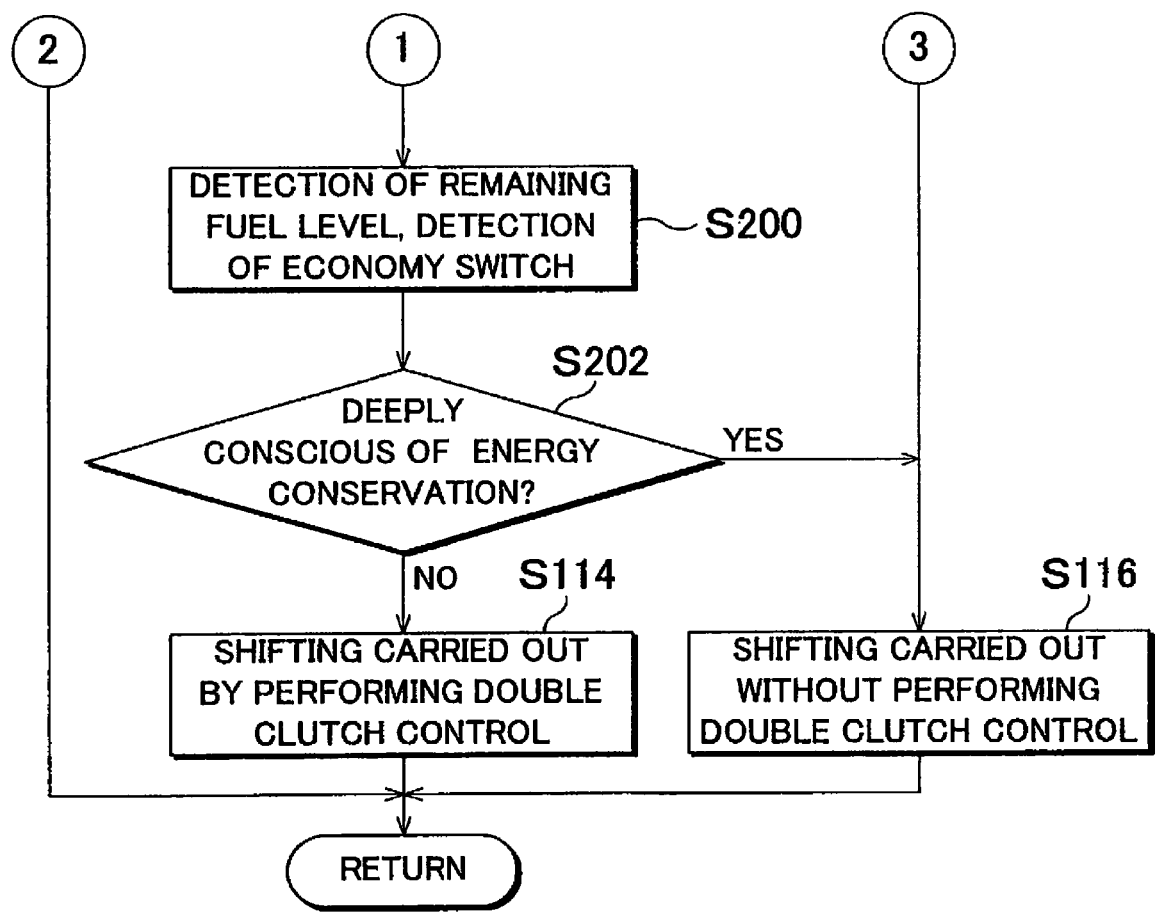

Referring to FIGS. 6, 7A and 7B, a second embodiment of the invention will be described. In the aforementioned first embodiment, it is determined whether to perform the double clutch control or not depending on whether or not the driver feels a sense of incongruity. In the present embodiment, however, it is determined whether to perform the double clutch control depending on whether or not the driver is deeply conscious of energy conservation. In both the present embodiment and the aforementioned first embodiment, like components or steps are denoted by like reference symbols. Description of the same components or steps will not be repeated.

As shown in FIG. 6, an economy switch 618 and a fuel level sensor 620 are connected to the ECU 600 of the vehicle 100 mounted with a shifting apparatus according to the present embodiment. The economy switch 618 carries out shifting (upshift) at an engine speed lower than usual. In the case where a running mode (economy mode) with importance attached to fuel consumption (with reduced fuel consumption) is preferred, the driver turns the economy switch 618 on.

The fuel level sensor 620 is provided in a fuel tank 700. The fuel level sensor 620 detects a remaining amount of fuel stored in the fuel tank 700. A signal indicating the remaining amount detected is transmitted to the ECU 600.

Referring to FIGS. 7A and 7B, the control structure of a program executed by the ECU 600 in the vehicle mounted with the shifting apparatus according to the present embodiment will be described. The present embodiment is different from the aforementioned first embodiment in that S200 and S202 have been added. As for the other processings, the present embodiment is identical with the above-mentioned first embodiment. Accordingly, those processings will not be described in detail.

In S200, the ECU 600 detects a remaining fuel level (a remaining amount of fuel) and an operation state of the economy switch 618. The operation state of the economy switch 618, which indicates whether or not the economy mode has been selected, is detected as a kind of driving preference of the driver.

In S202, the ECU 600 determines whether or not the driver is deeply conscious of energy conservation. For example, if the remaining fuel level is lower than a predetermined level or if the economy switch 618 has been turned on, it is determined that the driver is deeply conscious of energy conservation. If the driver is not deeply conscious of energy conservation (NO in S202), a transition to S114 is made. If the driver is deeply conscious of energy conservation (YES in S202), a transition to S116 is made.

In the vehicle mounted with the shifting apparatus according to the present embodiment which is based on the aforementioned construction and flowchart, the operation of the ECU 600 will be described.

If a remaining fuel level and an operation state of the economy switch 618 are detected (S200), it is determined whether or not the driver is deeply conscious of energy conservation (S202). If the fuel level is higher than the predetermined level or if the economy switch 618 is off, it is determined that the driver is not deeply conscious of energy conservation (NO in S202), and shifting is carried out by performing the double clutch control (S114).

If the fuel level is lower than the predetermined level or if the economy switch 618 is on, it is determined that the driver is deeply conscious of energy conservation (YES in S202), and shifting is carried out without performing the double clutch control (S116).

As described above, in the vehicle mounted with the shifting apparatus according to the present embodiment, the ECU detects a remaining fuel level and an operation state of the economy switch and determines whether or not the driver is deeply conscious of energy conservation. If the driver is not deeply conscious of energy conservation, shifting is carried out by performing the double clutch control. If the driver is deeply conscious of energy conservation, shifting is carried out without performing the double clutch control. Thus, the consumption of a larger amount of fuel resulting from a rise in the output speed of the engine can be suppressed. As a result, a deterioration in fuel consumption can be suppressed. Also, when the driver has a desire to suppress the consumption of fuel, a sense of incongruity resulting from an unsuppressed consumption amount can be suppressed.

Figure 8A:
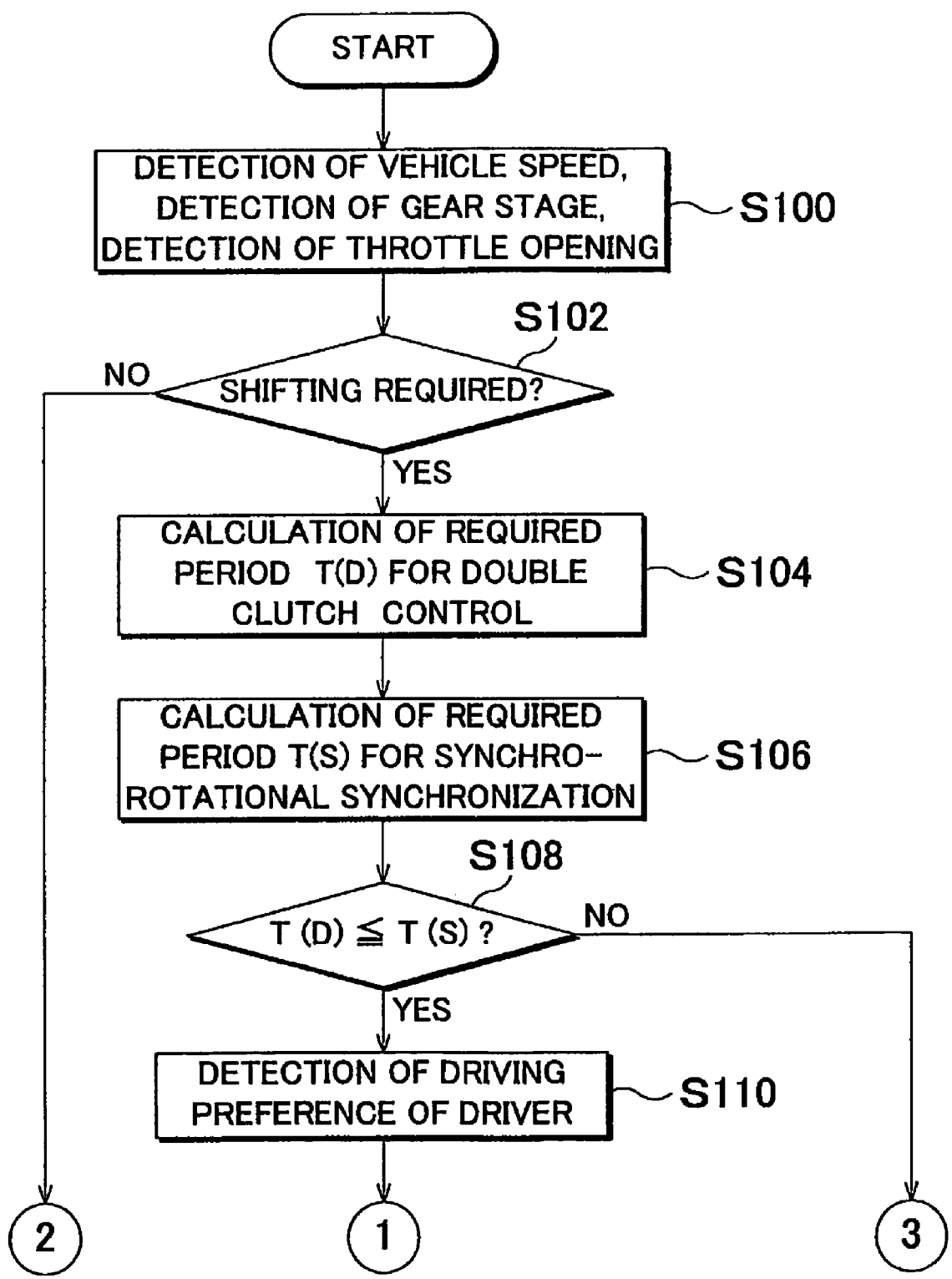

Referring to FIGS. 8A and 8B, a third embodiment of the invention will be described. In the aforementioned first embodiment, the required period T(D) for performing the double clutch control and the required period T(S) for the synchro-rotational synchronization are calculated using the map stored in the ROM. In the present embodiment, however, values in the map are corrected (learned) on the basis of an actual required period for synchronization.

In other respects, the third embodiment is identical in construction and function with the aforementioned first embodiment. Therefore, detailed description thereof will not be repeated hereinafter.

Referring to FIGS. 8A and 8B, the control structure of a program that is executed by the ECU 600 in the vehicle mounted with the shifting apparatus according to the present embodiment will be described. The present embodiment is different from the aforementioned first embodiment in that S300 to S304 and S400 to S404 have been added. In the other processings, the present embodiment is identical with the aforementioned first embodiment. Accordingly, those processings are denoted by the same reference symbols and detailed description thereof will not be described hereinafter.

In S300, the ECU 600 calculates (measures) an actual performance period TR(D) for the double clutch control. The actual performance period TR(D) may be calculated using, for example, a timer counter included in the ECU 600 or the like. In S302, the ECU 600 calculates a difference TD(D) (TD(D)=TR(D)−T(D)) between a map value T(D) and the performance period TR(D).

In S304, the ECU 600 corrects the map value using the time difference TD(D). To correct the map value, it is appropriate, for example, that a correction value 0.1×TD(D) be added to the map value T(D). The coefficient "0.1" represents an exemplary smoothing processing. It is not absolutely required that the coefficient be "0.1".

In S400, the ECU 600 calculates (measures) an actual performance period TR(S) for the synchro-rotational synchronization. The actual performance period TR(S) may be calculated using, for example, the timer counter included in the ECU 600 or the like. In S402, the ECU 600 calculates a difference TD(S) (TD(S)=TR(S)−T(S)) between a map value T(S) and the performance period TR(S).

In S404, the ECU 600 corrects the map value using the time difference TD(S). To correct the map value, it is appropriate, for example, that a correction value 0.1×TD(S) be added to the map value T(S). The coefficient "0.1" represents an exemplary smoothing processing. It is not absolutely required that the coefficient be "0.1".

In the vehicle mounted with the shifting apparatus according to the present embodiment which is based on the aforementioned construction and flowchart, the operation of the ECU 600 will be described.

If shifting is carried out by performing the double clutch control (S114), the actual performance period TR(D) for the double clutch control is calculated (S300), and the difference TD(D) (TD(D)=TR(D)−T(D)) between the map value T(D) and the performance period TR(D)is calculated (S302). The correction value (0.1×TD(D)) that has been calculated using the difference TD(D) is added to the map value T(D), so that the map value T(D) is corrected (S304).

If shifting is carried out without performing the double clutch control (S116), the actual performance period TR(S) for the synchro-rotational synchronization is calculated (S400), and the difference TD(S) (TD(S)=TR(S)−T(S)) between the map value T(S) and the performance period TR(S) is calculated (S402). The correction value (0.1×TD(S)) that has been calculated using the difference TD(S) is added to the map value T(S), so that the map value T(S) is corrected (S404).

As described above, in the vehicle mounted with the shifting apparatus according to the present embodiment, the ECU corrects the map values T(D) and T(S) using the actual performance period TR(D) for the double clutch control and the actual performance period TR(S) for the synchro-rotational synchronization. Thus, the required period T(D) for performing the double clutch control and the required period T(S) for the synchro-rotational synchronization can be calculated with high precision.

The embodiments disclosed herein are exemplary in all respects and should not be considered to be limitative. The scope of the invention is defined not by the foregoing description but by the following claims. The invention is intended to incorporate all the modifications that are equivalent in sense and scope to the claims.

The invention claimed is:

1. A shifting apparatus including a meshed gear transmission and a clutch that couples/decouples the meshed gear transmission to/from a power unit, wherein the meshed gear transmission includes an input shaft, an output shaft, and a synchronization mechanism, and wherein the shifting apparatus includes synchronization means, comprising:
 a controller configured to calculate a first synchronization period required for synchronization by the synchronization mechanism to mechanically synchronize a rotational speed of the input shaft with a rotational speed of the output shaft during shifting, the synchronization mechanism including a plurality of synchromesh mechanisms configured to couple the input shaft and output shaft to a plurality of clutch gears,
 the controller is configured to calculate a second synchronization period required for synchronization by the synchronization means to perform double clutch control by rendering the meshed gear transmission in a neutral state where the input shaft is mechanically decoupled from the output shaft, connecting the clutch, controlling an output rotational speed of the power unit, and synchronizing the rotational speed of the input shaft with the rotational speed of the output shaft,
 the controller is configured to compare the first synchronization period with the second synchronization period prior to a shift in the meshed gear transmission, and
 the controller is configured to shift the meshed gear transmission by synchronizing the rotational speed of the input shaft with the rotational speed of the output shaft by means of the synchronization mechanism without performing the double clutch control if the first synchronization period is shorter than the second synchronization period and that shifts the meshed gear transmission by synchronizing the rotational speed of the input shaft with the rotational speed of the output shaft by means of the synchronization means to perform the double clutch control if the second synchronization period is equal to or shorter than the first synchronization period.

2. The shifting apparatus according to claim 1, wherein the controller calculates the first synchronization period required for synchronization by the synchronization mechanism on the basis of a map stored in advance.

3. The shifting apparatus according to claim 2, wherein the controller updates the first synchronization period by storing into the map a value that has been corrected and learned on the basis of a difference between a calculated period and an actual performance period.

4. The shifting apparatus according to claim 1, wherein the controller calculates the second synchronization period on the basis of a map stored in advance.

5. The shifting apparatus according to claim 4, wherein the controller updates the second synchronization period by storing into the map a value that has been corrected and learned on the basis of a difference between a calculated period and an actual performance period.

6. The shifting apparatus according to claim 1, wherein the shifting apparatus is mounted in a vehicle and the controller further
 detects a driving preference of a driver of the vehicle;
 decides whether to permit or prohibit synchronization by the synchronization means on the basis of the detected driving preference; and
 shifts the meshed gear transmission by synchronizing a rotational speed of the input shaft with a rotational speed of the output shaft by means of the synchronization mechanism if synchronization by the synchronization means is prohibited.

7. The shifting apparatus according to claim 6, wherein the controller further determines, on the basis of the detected driving preference, whether or not synchronization by the synchronization means conveys a sense of incongruity to the driver; and
 decides to prohibit synchronization by the synchronization means if it is determined that synchronization by the synchronization means conveys a sense of incongruity to the driver.

8. The shifting apparatus according to claim 6, wherein the driving preference detected by the controller includes detecting a gear stage depending on one of whether a manual shift mode has been selected by the driver through a switching operation and whether a sport mode has been selected in which an engine speed for carrying out shifting is set higher than a predetermined engine speed.

9. The shifting apparatus according to claim 1, wherein the controller detects a remaining amount of energy supplied to the power unit; and
 prohibits synchronization by the synchronization means and carries out synchronization by the synchronization mechanism if the detected remaining amount of energy is smaller than a predetermined remaining amount.

10. A shifting control method for a shifting apparatus including a meshed gear transmission and a clutch that couples/decouples the meshed gear transmission to/from a power unit, wherein the meshed gear transmission includes an input shaft, an output shaft, and a synchronization mechanism, and wherein the shifting apparatus includes synchronisation means, the method comprising:

detecting a vehicle running speed, a rotational speed of the input shaft, a rotational speed of the output shaft, and a rotational speed of the vehicle engine;

calculating a first synchronization period required for synchronization by the synchronization mechanism to mechanically synchronize a rotational speed of the input shaft with a rotational speed of the output shaft during shifting, the synchronization mechanism including a plurality of synchromesh mechanisms configured to couple the input shaft and output shaft to a plurality of clutch gears;

calculating a second synchronization period required for synchronization by the synchronization means to perform double clutch control by rendering the meshed gear transmission in a neutral state where the input shaft is mechanically decoupled from the output shaft, connecting the clutch, controlling an output rotational speed of the power unit, and synchronizing the rotational speed of the input shaft with the rotational speed of the output shaft;

comparing the first synchronization period with the second synchronization period;

shifting the meshed gear transmission by synchronizing the rotational speed of the input shaft with the rotational speed of the output shaft by means of the synchronization mechanism without performing the double clutch control if the first synchronization period is shorter than the second synchronization period; and shifting the meshed gear transmission by synchronizing the rotational speed of the input shaft with the rotational speed of the output shaft by means of the synchronization means to perform the double clutch control if the second synchronization period is equal to or shorter than the first synchronization period.

11. The shifting control method according to claim 10, wherein the first synchronization period is calculated on the basis of a map stored in advance.

12. The shifting control method according to claim 11, wherein the first synchronization period is updated by storing into the map a value that has been corrected and learned on the basis of a difference between a calculated period and an actual performance period.

13. The shifting control method according to claim 10, wherein the second synchronization period is calculated on the basis of a map stored in advance.

14. The shifting control method according to claim 13, wherein the second synchronization period is updated by storing into the map a value that has been corrected and learned on the basis of a difference between a calculated period and an actual performance period.

15. The shifting control method according to claim 10, wherein further detecting a driving preference of a driver of a vehicle;

deciding whether to permit or prohibit synchronization by the synchronization means on the basis of the detected driving preference; and shifting the meshed gear transmission by synchronizing a rotational speed of the input shaft with a rotational speed of the output shaft by means of the synchronization mechanism if synchronization by the synchronization means is prohibited.

16. The shifting control method according to claim 15, wherein further determining on the basis of the detected driving preference, whether or not synchronization by the synchronization means conveys a sense of incongruity to the driver; and deciding to prohibit synchronization by the synchronization means if it is determined that synchronization by the synchronization means conveys a sense of incongruity to the driver.

17. The shifting control method according to claim 10, wherein further detecting a remaining amount of energy supplied to the power unit; and prohibiting synchronization by the synchronization means and carrying out synchronization by the synchronization mechanism if the detected remaining amount of energy is smaller than a predetermined remaining amount.

\* \* \* \* \*